UNITED STATES PATENT OFFICE.

OTTO B. HEINZE, OF BALTIMORE, MARYLAND.

MANUFACTURE OF MANTLES OR INCANDESCING ELEMENTS FOR GAS-BURNERS.

SPECIFICATION forming part of Letters Patent No. 632,349, dated September 5, 1899.

Application filed August 16, 1898. Serial No. 688,731. (No specimens.)

*To all whom it may concern:*

Be it known that I, OTTO B. HEINZE, of Baltimore, in the State of Maryland, have invented certain new and useful Improvements in the Manufacture of Mantles or Incandescing Elements for Gas-Burners, of which the following is a full, clear, and exact description.

The object of the invention is to provide certain new and useful improvements in the manufacture of mantles or incandescing elements for gas-burners, whereby the mantles or elements are practically rendered indestructible without impairing their illuminating quality and at the same time the mantles are rendered flexible and firm after ignition and are prevented from shrinking when in use.

For the purpose of my invention I produce upon the surface of the refractory material of which the mantle or element is composed a thin coating of a vitreous body and then heat the mantle or element to fuse the coating with the refractory porous mass of the mantle or element.

In my invention I take advantage of the physical properties of glass or vitreous bodies being very flexible when in a state of filaments or films, and I find by experiment that if such vitreous body or glass flux is brought in contact with or is intimately mixed with calcined thorium oxid and exposed to a high heat then the calcined thorium oxid does not unite chemically or dissolve in them, but forms a white enamel with such flux and at the same time retains its illuminating power when heated to incandescence.

In carrying out the object of my invention I incorporate by trituration a vitreous body or glass flux about three per cent., by weight, with a thin solution of fish-glue, into which the previously-formed mantles or elements are dipped. After the mantles have been dipped in this mixture and have been thoroughly dried they are ready to be placed in lamps, and when the gas in the burner is lighted then the result is that the fine powder of the enamel or flux which was evenly distributed over the surface of the mantle fuses in the heat of the flame, coating and partly penetrating the refractory porous mass of which the mantle is composed, so as to render the same firm, flexible, and not liable to contract or shrink and at the same time increases its illuminating power and renders the light emitted softer and pleasanter to the eye. The vitreous body or glass flux resists the high temperature to which the mantle is to be exposed, and it is a chemical combination of silicic or boric acid with two or more of the fixed alkalies or alkalic earths and is preferably composed of oxid of lead or, as its equivalent, barium carbonate, ninety-one to one hundred parts; silica, three hundred and ninety-seven parts; biborate of soda, two hundred and thirty-seven parts; calcium carbonate, one hundred and eighty-two parts, kaolin, one hundred and twenty-seven parts. The ingredients are fritted and then ground in a porcelain mill, and to the ingredients may be added five to ten per cent. thorium oxid to increase the illuminating power of the enamel.

I find by experiment that the solution of fish-glue is especially suited to mix the vitreous ingredients with, as it seems to facilitate the fusion of the glazes, and I attribute this result to a small amount of mineral earth contained in the fish-glue. Furthermore, the addition of fish-glue or isinglass to a small quantity of glycerin or other hydroscopic substance prevents the mantle from shrinking and losing its shape during the drying process.

Mantles prepared according to my process need no preliminary burning off or incineration, but may be placed on the lamp and lighted at once, after which they will permanently retain their shape, firmness, flexibility, and also their illuminating power.

The coating is very thin and does not perceptibly increase the weight or thickness of the mantle or filament and does not impair the illuminating power, but renders the mantle flexible and non-porous, and hence is not liable to be affected by moisture in the atmosphere.

I do not limit myself to the exact proportions of the ingredients given for forming the vitreous body, as it is evident they may be varied without deviating from the spirit of my invention.

Having thus fully described my invention, I claim as new and desire to secure by Letters Patent—

1. The herein-described method for treating mantles or incandescing elements, consisting in coating the refractory material of which the mantle or element is made, with a vitreous body, and then heating the mantle or element to fuse the coating with the refractory porous material, substantially as described.

2. As a new article of manufacture, a mantle or incandescing element, consisting of a refractory mass, and an external coating of a vitreous body fused to the mass by heat, substantially as described.

3. The herein-described composition for forming a vitreous body to be used as a coating for mantles or incandescing elements, consisting of oxid of lead, silica, biborate of soda, calcium carbonate and kaolin, in about the proportions specified.

4. The herein-described composition for forming a vitreous body to be used as a coating for mantles or incandescing elements, consisting of oxid of lead, silica, biborate of soda, calcium carbonate and kaolin, in about the proportions specified, with the addition of calcined thorium oxid, substantially as shown and described.

OTTO B. HEINZE.

Witnesses:
ZENO F. PARUS,
CHAS. H. HARTUNG.